(12) United States Patent
Zhang et al.

(10) Patent No.: US 12,363,310 B2
(45) Date of Patent: Jul. 15, 2025

(54) GUIDED PROBABILITY MODEL FOR COMPRESSED REPRESENTATION OF NEURAL NETWORKS

(71) Applicant: Nokia Technologies Oy, Espoo (FI)

(72) Inventors: Honglei Zhang, Tampere (FI); Francesco Cricri, Tampere (FI); Emre Baris Aksu, Tampere (FI); Hamed Rezazadegan Tavakoli, Espoo (FI)

(73) Assignee: Nokia Technologies Oy, Espoo (FI)

( * ) Notice: Subject to any disclaimer, the term of this patent is extended or adjusted under 35 U.S.C. 154(b) by 71 days.

(21) Appl. No.: 17/999,107

(22) PCT Filed: Jun. 3, 2021

(86) PCT No.: PCT/IB2021/054845
§ 371 (c)(1),
(2) Date: Nov. 17, 2022

(87) PCT Pub. No.: WO2021/255567
PCT Pub. Date: Dec. 23, 2021

(65) Prior Publication Data
US 2023/0217028 A1 Jul. 6, 2023

Related U.S. Application Data

(60) Provisional application No. 63/039,765, filed on Jun. 16, 2020.

(51) Int. Cl.
*H04N 19/149* (2014.01)
*H04N 19/176* (2014.01)
*H04N 19/30* (2014.01)

(52) U.S. Cl.
CPC ......... *H04N 19/149* (2014.11); *H04N 19/176* (2014.11); *H04N 19/30* (2014.11)

(58) Field of Classification Search
CPC . G06T 2207/20084; G06T 2207/20081; G06T 5/60; G06T 3/4046; G06T 7/143;
(Continued)

(56) References Cited

U.S. PATENT DOCUMENTS 10,149,958 B1 * 12/2018 Tran ........................ G16H 50/20
10,542,267 B2 * 1/2020 Cook .................... H04N 19/124
(Continued)

FOREIGN PATENT DOCUMENTS

EP 3633990 A1 4/2020

OTHER PUBLICATIONS

"Video Coding for Low Bit Rate Communication", Series H: Audiovisual and Multimedia Systems, Infrastructure of audiovisual services—Coding of moving Video, ITU-T Recommendation H.263, Jan. 2005, 226 pages.
(Continued)

*Primary Examiner* — Daniel Chang
(74) *Attorney, Agent, or Firm* — McCarter & English, LLP

(57) ABSTRACT

In example embodiments, an apparatus, a method, and a computer program product are provided. The apparatus comprises at least one processor; and at least one non-transitory memory including computer program code; wherein the at least one memory and the computer program code are configured to, with the at least one processor, cause the apparatus at least to perform determine a processing order of building blocks to encode or decode a media item; and determine a number of processing steps required to encode or decode the media item; wherein the processing order of building blocks and the number of processing steps are determined based on a content of the media item by using a guided probability model based on a neural network.

18 Claims, 11 Drawing Sheets

(58) Field of Classification Search
CPC ........ G06N 3/045; G06N 20/00; G06N 3/047; G06N 3/0464; G06N 3/02
See application file for complete search history.

(56) References Cited

U.S. PATENT DOCUMENTS

| | | | | |
|---|---|---|---|---|
| 10,652,581 | B1* | 5/2020 | Bokov | H04N 19/194 |
| 11,010,929 | B2* | 5/2021 | Xie | G06N 3/084 |
| 2008/0001735 | A1* | 1/2008 | Tran | A61B 8/565 |
| | | | | 340/539.22 |
| 2019/0246102 | A1* | 8/2019 | Cho | G06N 3/045 |
| 2020/0160565 | A1* | 5/2020 | Ma | H04N 19/60 |
| 2020/0311946 | A1* | 10/2020 | Price | G06T 7/136 |
| 2020/0327309 | A1* | 10/2020 | Cheng | G06N 3/084 |
| 2020/0366914 | A1* | 11/2020 | Schroers | G06N 3/02 |
| 2021/0065002 | A1* | 3/2021 | Samek | G06N 3/063 |
| 2021/0084301 | A1* | 3/2021 | Siekmann | H04N 19/176 |
| 2021/0117760 | A1* | 4/2021 | Krishnan | G06N 3/08 |
| 2021/0120247 | A1* | 4/2021 | Galpin | G06N 3/02 |
| 2021/0400286 | A1* | 12/2021 | Kale | G06F 13/4282 |
| 2021/0400315 | A1* | 12/2021 | Kale | H04N 19/50 |
| 2022/0164630 | A1* | 5/2022 | Hou | G06N 3/088 |
| 2022/0237740 | A1* | 7/2022 | Lu | G06T 3/4046 |
| 2022/0256227 | A1* | 8/2022 | Rezazadegan Tavakoli | |
| | | | | A61B 5/4839 |
| 2022/0309350 | A1* | 9/2022 | Hamidi-Rad | G06N 3/082 |
| 2022/0329876 | A1* | 10/2022 | Djelouah | G06N 3/045 |
| 2022/0360854 | A1* | 11/2022 | Gao | H04N 21/4662 |
| 2022/0393986 | A1* | 12/2022 | Haase | G06N 3/063 |
| 2022/0394240 | A1* | 12/2022 | Zhang | H04N 19/593 |
| 2023/0217028 | A1* | 7/2023 | Zhang | H04N 19/30 |
| | | | | 375/240.02 |
| 2024/0028972 | A1* | 1/2024 | Tensmeyer | G06F 18/214 |

OTHER PUBLICATIONS

"Advanced Video Coding for Generic Audiovisual services", Series H: Audiovisual And Multimedia Systems, Infrastructure of audiovisual services—Coding of moving Video, Recommendation ITU-T H.264, Apr. 2017, 812 pages.

Cao et al., "Lossless Image Compression through Super-Resolution", arXiv, Apr. 6, 2020, pp. 1-18.

Mentzer et al., "Practical Full Resolution Learned Lossless Image Compression", arXiv, May 27, 2019, pp. 1-14.

Salimans et al., "PixelCNN++: Improving the PixelCNN with Discretized Logistic Mixture Likelihood and Other Modifications", ICLR, Nov. 5, 2016, pp. 1-10.

Oord et al., "Conditional Image Generation with PixelCNN Decoders", arXiv, Jun. 18, 2016, pp. 1-13.

Ma et al., "Convolutional Neural Network-Based Arithmetic Coding for HEVC Intra-Predicted Residues", IEEE Transactions on Circuits and Systems for Video Technology, vol. 30, No. 7, Jul. 2020, pp. 1901-1916.

"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.

"Information technology—Generic coding of moving pictures and associated audio Information: Video", Series H: Audiovisual and Multimedia Systems Infrastructure of audiovisual services—Coding of moving video, ITU-T Recommendation H.262, Feb. 2000, 220 pages.

"Information technology—Universal coded character set (UCS)", ISO/IEC 10646, Sixth edition, Dec. 2020, 9 pages.

"IEEE 802.11", Wikipedia, Retrieved on Dec. 6, 2022, Webpage available at : https://en.wikipedia.org/wiki/IEEE_802.11.

"Information Technology—Coding of Audio-Visual Objects—Part 12: ISO Base Media File Format", ISO/IEC 14496-12, Fifth edition, Dec. 15, 2015, 248 pages.

"Information Technology—Coding of Audio-Visual Objects—Part 15: Advanced Video Coding (AVC) File Format", ISO/IEC 14496-15, First edition, Apr. 15, 2004, 29 pages.

International Search Report and Written Opinion received for corresponding Patent Cooperation Treaty Application No. PCT/IB2021/054845, dated Sep. 24, 2021, 15 pages.

Zou et al., "End-to-End Learning for Video Frame Compression with Self-Attention", arXiv, Apr. 20, 2020, 5 pages.

Zhang et al., "Lossless Image Compression Using a Multi-scale Progressive Statistical Model", Proceedings of the Asian Conference on Computer Vision (ACCV), 2020, pp. 609-622.

Dumas et al., "Context-adaptive neural network based prediction for image compression", arXiv, Jul. 17, 2018, pp. 1-13.

"High Efficiency Video Coding", Series H: Audiovisual and Multimedia Systems, Infrastructure of audiovisual services—Coding of moving video, Recommendation ITU-T H.265, Feb. 2018, 692 pages.

* cited by examiner

GUIDED PROBABILITY MODEL FOR COMPRESSED REPRESENTATION OF NEURAL NETWORKS

RELATED APPLICATIONS

This application claims priority to PCT Application No. PCT/IB2021/054845, filed on Jun. 3, 2021, which claims priority to U.S. Provisional Application No. 63/039,765, filed on Jun. 16, 2020, each of which is incorporated herein by reference in its entirety.

TECHNICAL FIELD

The examples and non-limiting embodiments relate generally to media item compression and, more particularly, to guided probability model for a compressed representation of neural networks.

BACKGROUND

It is known to provide standardized formats for exchange of neural networks.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
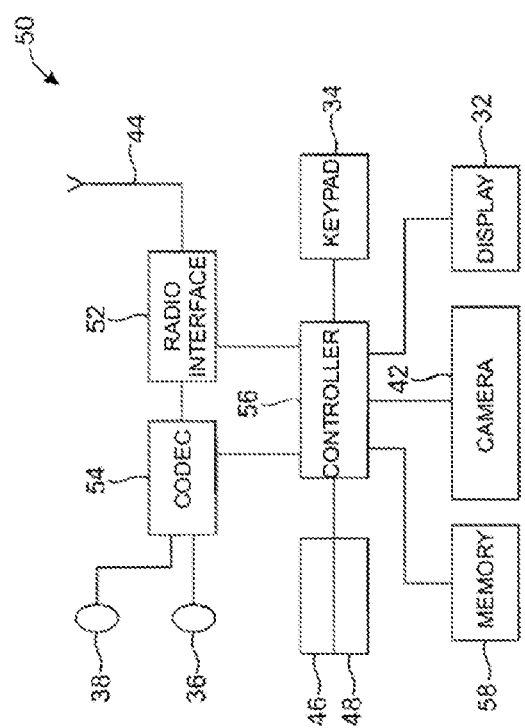
FIG. 1 shows schematically an electronic device employing embodiments of the examples described herein.
Figure 2:
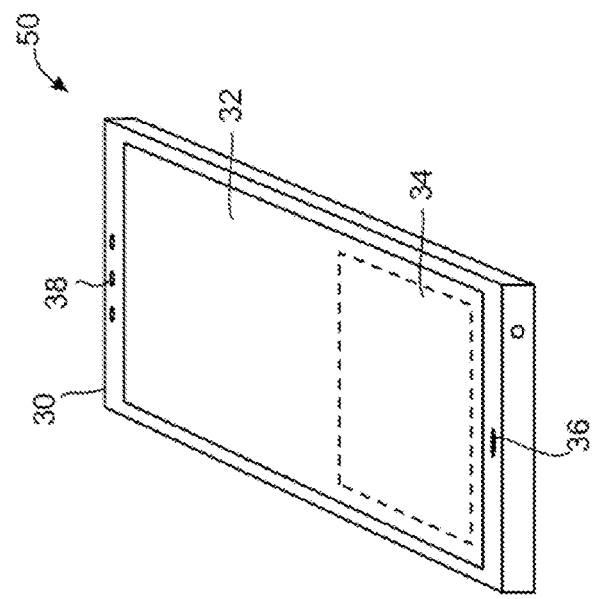
FIG. 2 shows schematically a user equipment suitable for employing embodiments of the examples described herein.

The following acronyms and abbreviations that may be found in the specification and/or the drawing figures are defined as follows:

3GP 3GPP file format
3GPP 3rd Generation Partnership Project
3GPP TS 3GPP technical specification
4CC four character code
4G fourth generation of broadband cellular network technology
5G fifth generation cellular network technology
5GC 5G core network
ACC accuracy
AI artificial intelligence
AIoT AI-enabled IoT
a.k.a. also known as
AMF access and mobility management function
AVC advanced video coding
CABAC context-adaptive binary arithmetic coding
CDMA code-division multiple access
CE core experiment
CU central unit
DASH dynamic adaptive streaming over HTTP
DCT discrete cosine transform
DSP digital signal processor
DU distributed unit
eNB (or eNodeB) evolved Node B (for example, an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, for example, the LTE radio access technology
FDMA frequency division multiple access
f(n) fixed-pattern bit string using n bits written (from left to right) with the left bit first.
F1 or F1-C interface between CU and DU control interface
gNB (or gNodeB) base station for 5G/NR, for example, a node providing NR user plane and control plane protocol terminations towards the UE, and connected via the NG interface to the 5GC
GSM Global System for Mobile communications
H.222.0 MPEG-2 Systems is formally known as ISO/IEC 13818-1 and as ITU-T Rec. H.222.0
H.26x family of video coding standards in the domain of the ITU-T
HLS high level syntax
IBC intra block copy
ID identifier
IEC International Electrotechnical Commission
IEEE Institute of Electrical and Electronics Engineers
I/F interface
IMD integrated messaging device
IMS instant messaging service
IoT internet of things
IP internet protocol
ISO International Organization for Standardization
ISOBMFF ISO base media file format
ITU International Telecommunication Union
ITU-T ITU Telecommunication Standardization Sector
LTE long-term evolution
LZMA Lempel-Ziv-Markov chain compression
LZMA2 simple container format that can include both uncompressed data and LZMA data
LZO Lempel-Ziv-Oberhumer compression
LZW Lempel-Ziv-Welch compression
MAC medium access control
mdat MediaDataBox
MME mobility management entity
MMS multimedia messaging service
moov MovieBox
MP4 file format for MPEG-4 Part 14 files
MPEG moving picture experts group
MPEG-2 H.222/H.262 as defined by the ITU MPEG-4 audio and video coding standard for ISO/IEC 14496
MSB most significant bit
NAL network abstraction layer
NDU NN compressed data unit
ng or NG new generation
ng-eNB or NG-eNB
NN neural network
NNEF neural network exchange format
NNR neural network representation
NR new radio (5G radio)
N/W or NW network
ONNX Open Neural Network eXchange
PB protocol buffers
PC personal computer
PDA personal digital assistant
PDCP packet data convergence protocol
PHY physical layer
PID packet identifier
PLC power line communication
PSNR peak signal-to-noise ratio
RAM random access memory
RAN radio access network
RFC request for comments
RFID radio frequency identification
RLC radio link control
RRC radio resource control
RRH remote radio head
RU radio unit
Rx receiver
SDAP service data adaptation protocol
SGW serving gateway
SMF session management function
SMS short messaging service
st(v) null-terminated string encoded as UTF-8 characters as specified in ISO/IEC 10646
SVC scalable video coding
S1 interface between eNodeBs and the EPC
TCP-IP transmission control protocol-internet protocol
TDMA time divisional multiple access
trak TrackBox
TS transport stream
TV television
Tx transmitter
UE user equipment
ue(v) unsigned integer Exp-Golomb-coded syntax element with the left bit first
UICC Universal Integrated Circuit Card
UMTS Universal Mobile Telecommunications System
u(n) unsigned integer using n bits
UPF user plane function
URI uniform resource identifier
URL uniform resource locator
UTF-8 8-bit Unicode Transformation Format
WLAN wireless local area network
X2 interconnecting interface between two eNodeBs in LTE network
Xn interface between two NG-RAN nodes The following describes in detail suitable apparatus and possible mechanisms for a video/image encoding process according to embodiments. In this regard reference is first made to FIG. 1 and FIG. 2, where FIG. 1 shows an example block diagram of an apparatus 50. The apparatus may be an Internet of Things (IoT) apparatus configured to perform various functions, such as for example, gathering information by one or more sensors, receiving, or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 will be explained next.

The apparatus 50 may for example be a mobile terminal or user equipment of a wireless communication system, a sensor device, a tag, or other lower power device. However, it would be appreciated that embodiments of the examples described herein may be implemented within any electronic device or apparatus which may process data by neural networks.

The apparatus 50 may comprise a housing 30 for incorporating and protecting the device. The apparatus 50 further may comprise a display 32 in the form of a liquid crystal display. In other embodiments of the examples described herein the display may be any suitable display technology suitable to display an image or video. The apparatus 50 may further comprise a keypad 34. In other embodiments of the examples described herein any suitable data or user interface mechanism may be employed. For example, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the examples described herein may be any one of: an earpiece 38, speaker, or an analogue audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth® wireless connection or a USB/firewire wired connection.

The apparatus 50 may comprise a controller 56, processor or processor circuitry for controlling the apparatus 50. The controller 56 may be connected to memory 58 which in embodiments of the examples described herein may store both data in the form of image and audio data and/or may also store instructions for implementation on the controller 56. The controller 56 may further be connected to a codec circuitry 54 suitable for carrying out coding and/or decoding of audio and/or video data or assisting in coding and/or decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise a radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera capable of recording or detecting individual frames which are then passed to the codec circuitry 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
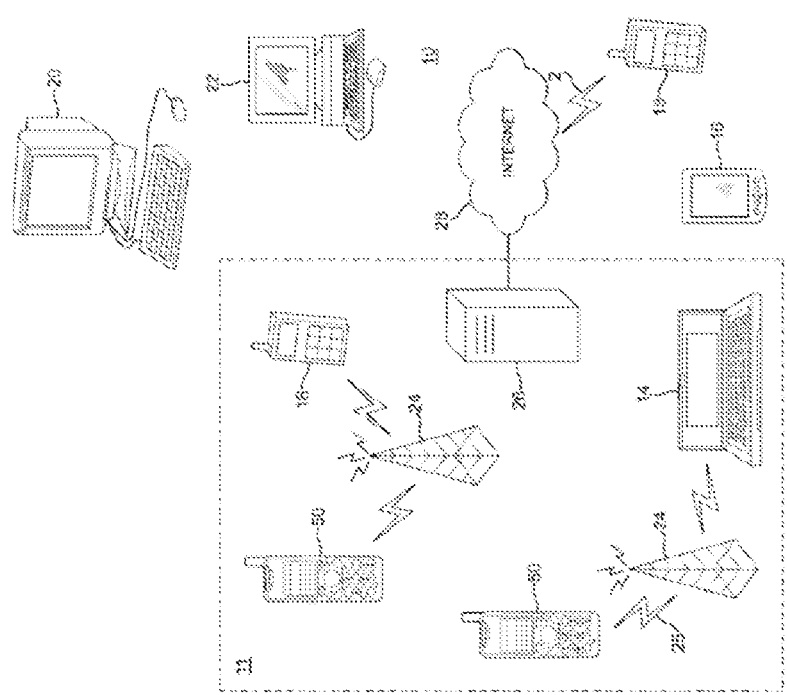
FIG. 3 further shows schematically electronic devices employing embodiments of the examples described herein connected using wireless and wired network connections.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA, LTE, 4G, 5G network, and the like), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; for example, a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the examples described herein may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in so-called IoT devices. The Internet of Things (IoT) may be defined, for example, as an interconnection of uniquely identifiable embedded computing devices within the existing Internet infrastructure. The convergence of various technologies has and may enable many fields of embedded systems, such as wireless sensor networks, control systems, home/building automation, and the like, to be included the Internet of Things (IoT). In order to utilize Internet IoT devices are provided with an IP address as a unique identifier. IoT devices may be provided with a radio transmitter, such as WLAN or Bluetooth transmitter or a RFID tag. Alternatively, IoT devices may have access to an IP-based network via a wired network, such as an Ethernet-based network or a power-line connection (PLC).

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can decompress the compressed video representation back into a viewable form. A video encoder and/or a video decoder may also be separate from each other, for example, need not form a codec. Typically, encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, for example, the difference between the predicted block of pixels and the original block of pixels, is coded. This is typically done by transforming the difference in pixel values using a specified transform (for example, Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction and current picture referencing), prediction is applied similarly to temporal prediction, but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
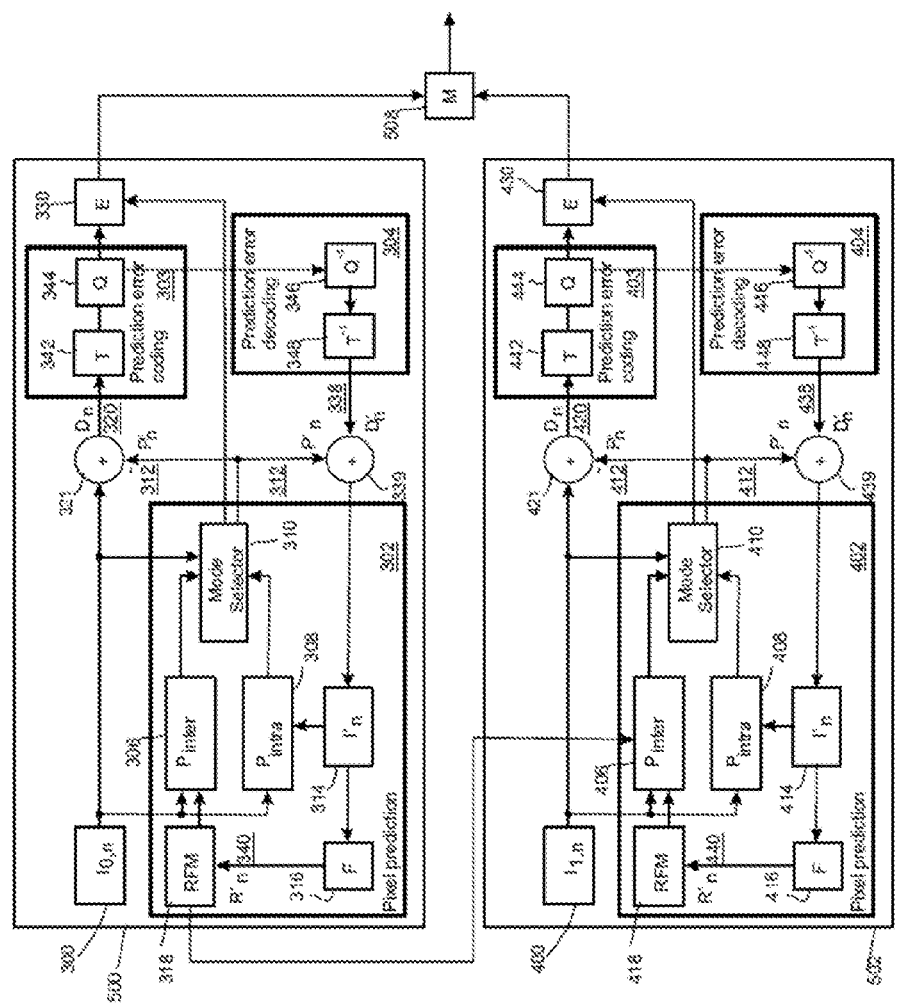
FIG. 4 shows schematically a block chart of an encoder on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The first encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives base layer images 300 of a video stream to be encoded at both the inter-predictor 306 (which determines the difference between the image and a motion compensated reference frame) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives enhancement layer images 400 of a video stream to be encoded at both the inter-predictor 406 (which determines the difference between the image and a motion compensated reference frame) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to the filter 316, 416. The filter 316, 416 receiving the preliminary representation may filter the preliminary representation and output a final reconstructed image 340, 440 which may be saved in the reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, for example, the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 346, 446, which dequantizes the quantized coefficient values, for example, DCT coefficients, to reconstruct the transform signal and an inverse transformation unit 348, 448, which performs the inverse transformation to the reconstructed transform signal wherein the output of the inverse transformation unit 348, 448 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream, for example, by a multiplexer 508.

Figure 5:
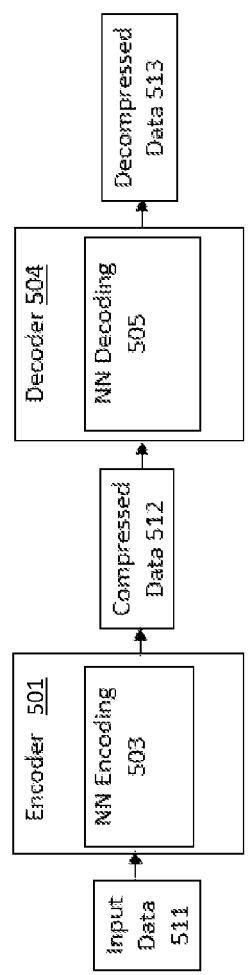
FIG. 5 is a block diagram showing the interface between an encoder and a decoder in accordance with the examples described herein.

FIG. 5 is a block diagram showing the interface between an encoder 501 implementing a neural network encoding 503, and a decoder 504 implementing a neural network decoding 505 in accordance with the examples described herein. The encoder 501 may embody a device, software method or hardware circuit. The encoder 501 has the goal of compressing input data 511 (for example, an input video) to compressed data 512 (for example, a bitstream) such that the bitrate is minimized, and the accuracy of an analysis or processing algorithm is maximized. To this end, the encoder 501 uses an encoder or compression algorithm, for example to the perform neural network encoding 503.

The general analysis or processing algorithm may be part of the decoder 504. The decoder 504 uses a decoder or decompression algorithm, for example to perform the neural network decoding 505 to decode the compressed data 512 (for example, compressed video) which was encoded by the encoder 501. The decoder 504 produces decompressed data 513 (for example, reconstructed data).

The encoder 501 and the decoder 504 may be entities implementing an abstraction, may be separate entities or the same entities, or may be part of the same physical device.

The analysis/processing algorithm may be any algorithm, traditional or learned from data. In the case of an algorithm which is learned from data, it is assumed that this algorithm can be modified or updated, for example using optimization via gradient descent. One example of the learned algorithm is a neural network.

Fundamentals of Neural Networks

A neural network (NN) is a computation graph consisting of several layers of computation. Each layer consists of one or more units, where each unit performs an elementary computation. A unit is connected to one or more other units, and a connection may be associated with a weight. The weight may be used for scaling the signal passing through an associated connection. Weights are learnable parameters, for example, values which can be learned from training data. There may be other learnable parameters, such as those of batch-normalization layers.

Two of the most widely used architectures for neural networks are feed-forward and recurrent architectures. Feed-forward neural networks are such that there is no feedback loop, each layer takes input from one or more of the layers before and provides its output as the input for one or more of the subsequent layers. Also, units inside a certain layer take input from units in one or more of preceding layers and provide output to one or more of following layers.

Initial layers, those close to the input data, extract semantically low-level features, for example, edges and textures in images, and intermediate and final layers extract more high-level features. After the feature extraction layers there may be one or more layers performing a certain task, for example, classification, semantic segmentation, object detection, denoising, style transfer, super-resolution, and the like. In recurrent neural networks, there is a feedback loop, so that the neural network becomes stateful, for example, it is able to memorize information or a state.

Neural networks are being utilized in an ever-increasing number of applications for many different types of devices, for example, mobile phones, chat bots, IoT devices, smart cars, voice assistants, and the like. Some of these applications include, but are not limited to, image and video analysis and processing, social media data analysis, device usage data analysis, and the like.

An important property of neural networks, and other machine learning tools, is that they are able to learn properties from input data, either in supervised way or in unsupervised way. Such learning is a result of a training algorithm, or of a meta-level neural network providing the training signal.

In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output's error, also referred to as the loss. Examples of losses are mean squared error, cross-entropy, and the like. In recent deep learning techniques, training is an iterative process, where at each iteration the algorithm modifies the weights of the neural network to make a gradual improvement in the network's output, for example, gradually decrease the loss.

Training a neural network is an optimization process, but the final goal is different from the typical goal of optimization. In optimization, the only goal is to minimize a function. In machine learning, the goal of the optimization or training process is to make the model learn the properties of the data distribution from a limited training dataset. In other words, the goal is to learn to use a limited training dataset in order to learn to generalize to previously unseen data, for example, data which was not used for training the model. This is usually referred to as generalization. In practice, data is usually split into at least two sets, the training set and the validation set. The training set is used for training the network, for example, to modify its learnable parameters in order to minimize the loss. The validation set is used for checking the performance of the network on data, which was not used to minimize the loss, as an indication of the final performance of the model. In particular, the errors on the training set and on the validation set are monitored during the training process to understand the following things:

If the network is learning at all—in this case, the training set error should decrease, otherwise the model is in the regime of underfitting.

If the network is learning to generalize—in this case, also the validation set error needs to decrease and to be not too much higher than the training set error. If the training set error is low, but the validation set error is much higher than the training set error, or it does not decrease, or it even increases, the model is in the regime of overfitting. This means that the model has just memorized the training set's properties and performs well only on that set, but performs poorly on a set not used for tuning or training its parameters.

Lately, neural networks have been used for compressing and de-compressing data such as images. The most widely used architecture for such task is the auto-encoder, which is a neural network consisting of two parts: a neural encoder and a neural decoder. In various embodiments, these neural encoder and neural decoder would be referred to as encoder and decoder, even though these refer to algorithms which are learned from data instead of being tuned manually. The encoder takes an image as an input and produces a code, to represent the input image, which requires less bits than the input image. This code may have obtained by a binarization or quantization process after the encoder. The decoder takes in this code and reconstructs the image which was input to the encoder.

Such encoder and decoder are usually trained to minimize a combination of bitrate and distortion, where the distortion is usually mean squared error (MSE), peak signal to noise ratio (PSNR), structural similarity (SSIM) index, or similar metrics. These distortion metrics are meant to be inversely proportional to the human visual perception quality.

Fundamentals of Video/Image Coding

Video codec consists of an encoder that transforms the input video into a compressed representation suited for storage/transmission and a decoder that can decompress the compressed video representation back into a viewable form. Typically, an encoder discards some information in the original video sequence in order to represent the video in a more compact form, for example, at lower bitrate.

Typical hybrid video codecs, for example ITU-T H.263 and H.264, encode the video information in two phases. Firstly, pixel values in a certain picture area (or "block") are predicted. In an example, the pixel values may be predicted by using motion compensation algorithm. This prediction technique includes finding and indicating an area in one of the previously coded video frames that corresponds closely to the block being coded. In other example, the pixel values may be predicted by using spatial prediction techniques. This prediction technique uses the pixel values around the block to be coded in a specified manner. Secondly, the prediction error, for example, the difference between the predicted block of pixels and the original block of pixels is coded. This is typically done by transforming the difference in pixel values using a specified transform, for example, discrete cosine transform (DCT) or a variant of it; quantizing the coefficients; and entropy coding the quantized coefficients. By varying the fidelity of the quantization process, encoder can control the balance between the accuracy of the pixel representation, for example, picture quality and size of the resulting coded video representation, for example, file size or transmission bitrate.

Inter prediction, which may also be referred to as temporal prediction, motion compensation, or motion-compensated prediction, exploits temporal redundancy. In inter prediction the sources of prediction are previously decoded pictures.

Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

The decoder reconstructs the output video by applying prediction techniques similar to the encoder to form a predicted representation of the pixel blocks. For example, using the motion or spatial information created by the encoder and stored in the compressed representation and prediction error decoding, which is inverse operation of the prediction error coding recovering the quantized prediction error signal in spatial pixel domain After applying prediction and prediction error decoding techniques the decoder sums up the prediction and prediction error signals, for example, pixel values to form the output video frame. The decoder and encoder can also apply additional filtering techniques to improve the quality of the output video before passing it for display and/or storing it as prediction reference for the forthcoming frames in the video sequence.

In typical video codecs the motion information is indicated with motion vectors associated with each motion compensated image block. Each of these motion vectors represents the displacement of the image block in the picture to be coded in the encoder side or decoded in the decoder side and the prediction source block in one of the previously coded or decoded pictures. In order to represent motion vectors efficiently those are typically coded differentially with respect to block specific predicted motion vectors. In typical video codecs the predicted motion vectors are created in a predefined way, for example, calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index is typically predicted from adjacent blocks and/or or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

In typical video codecs, the prediction residual after motion compensation is first transformed with a transform kernel, for example, DCT and then coded. The reason for this is that often there still exists some correlation among the residual and transform can in many cases help reduce this correlation and provide more efficient coding.

Typical video encoders utilize Lagrangian cost functions to find optimal coding modes, for example, the desired Macroblock mode and associated motion vectors. This kind of cost function uses a weighting factor $\lambda$ to tie together the exact or estimated image distortion due to lossy coding methods and the exact or estimated amount of information that is required to represent the pixel values in an image area:

$$C = D + \lambda R \qquad \text{equation 1}$$

In equation 1, C is the Lagrangian cost to be minimized, D is the image distortion, for example, mean squared error with the mode and motion vectors considered, and R is the number of bits needed to represent the required data to reconstruct the image block in the decoder including the amount of data to represent the candidate motion vectors.

Figure 6:
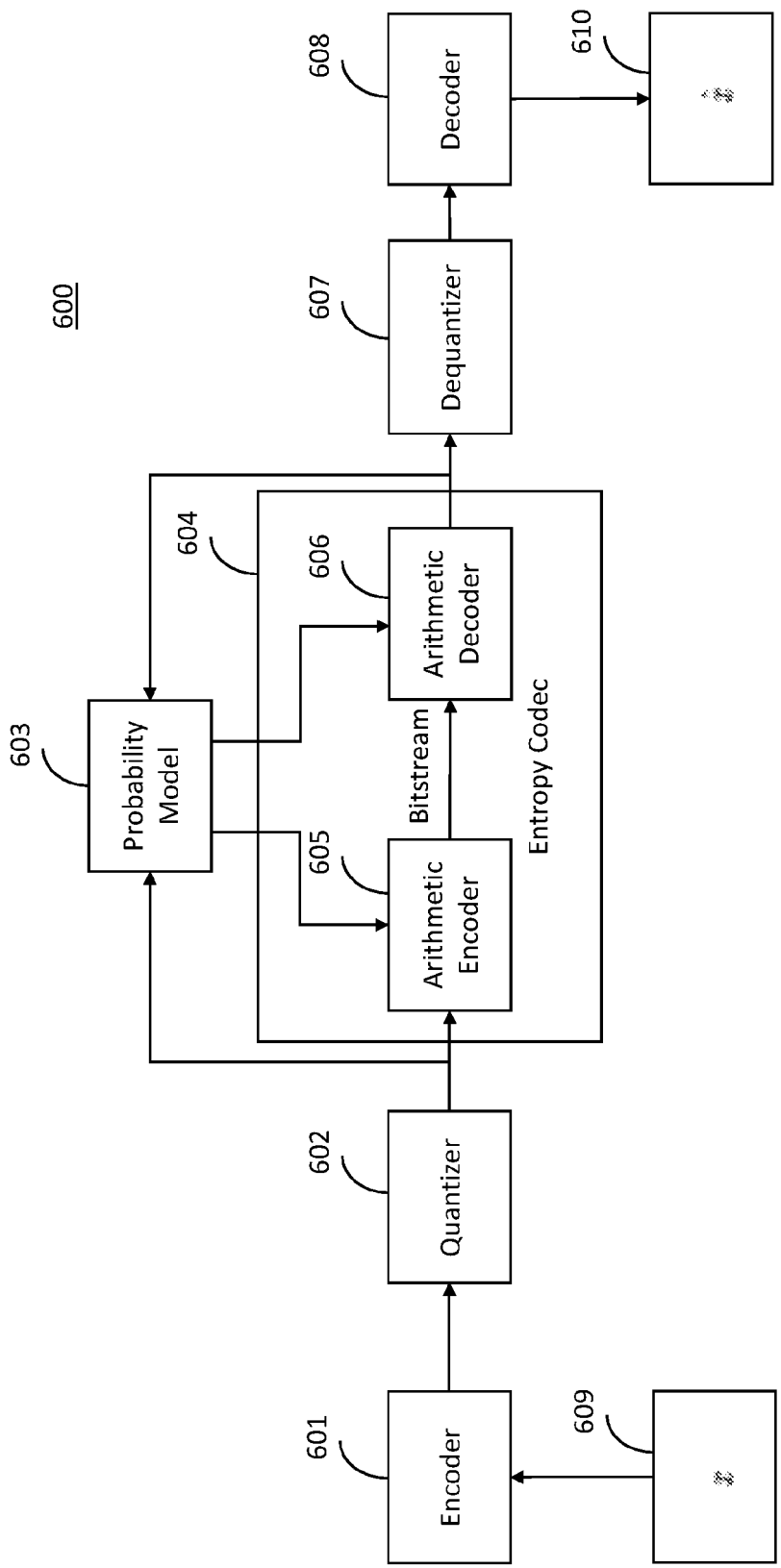
FIG. 6 is an example neural network-based end-to-end learned video coding system.

FIG. 6 is an example neural network-based end-to-end learned video coding system 600.

Fundamentals of Neural Network-Based End-to-End Learned Video Coding.

As shown FIG. 6, a typical neural network-based end-to-end learned video coding system 600 includes an encoder 601, a quantizer 602, a probability model 603, an entropy codec 604, for example, an arithmetic encoder 605 and an arithmetic decoder 606, a dequantizer 607, and a decoder 608. The encoder 601 and the decoder 608 are typically two neural networks, or mainly comprise neural network components. The probability model 603 may also comprise mainly neural network components. The Quantizer 602, the dequantizer 607, and the entropy codec 605 are typically not based on neural network components, but they may also potentially comprise neural network components. In some embodiments, the encoder, quantizer, probability model, entropy codec, arithmetic encoder, arithmetic decoder, dequantizer, and decoder, may also be referred to as an encoder component, quantizer component, probability model component, entropy codec component, arithmetic encoder component, arithmetic decoder component, dequantizer component, and decoder component respectively.

On the encoding side, the encoder 601 takes a video/image as an input 609 and converts the video/image in original signal space into a latent representation that may comprise a more compressible representation of the input. The latent representation may be normally a 3-dimensional tensor for image compression, where 2 dimensions represent spatial information and the third dimension contains information at that specific location. In the case of video compression, another dimension is used to represent temporal information. The quantizer 602 quantizes this latent representation into discrete values given a predefined quantization level. The probability model 603 and the arithmetic encoder 605 work together to perform lossless compression for the quantized latent representation and generate bitstreams to be sent to the decoder side. Given a symbol to be encoded to the bitstream, the probability model 603 estimates the probability distribution of all possible values for that symbol based on a context that is constructed from available information at the current encoding/decoding state, such as the data that has already encoded/decoded. The arithmetic encoder 605 encodes the input symbols to bitstream using the estimated probability distributions.

On the decoding side, opposite operations are performed. The arithmetic decoder 606 and the probability model 603 first decode symbols from the bitstream to recover the quantized latent representation. Then, the dequantizer 607 reconstructs the latent representation in continuous values and pass it to the decoder 608 to recover the input video/image. The recovered input video/image is provided as an output 610. Note that the probability model 603, in this video coding system 600, is shared between the arithmetic encoder 605 and arithmetic decoder 606. In practice, this means that a copy of the probability model 603 is used at the arithmetic encoder 605 side, and another exact copy is used at the arithmetic decoder 606 side.

In this video coding system 600, the encoder 601, the probability model 603, and the decoder 608 are normally based on deep neural networks. The system video coding 600 is trained in an end-to-end manner by minimizing the following rate-distortion loss function:

$$L = D + \lambda R \qquad \text{equation 2}$$

In equation 2, D is the distortion loss term, R is the rate loss term, and $\lambda$ is the weight that controls the balance between the two losses. The distortion loss term may be the mean square error (MSE), structure similarity (SSIM) or other metrics that evaluate the quality of the reconstructed video/image. Multiple distortion losses may be used and integrated into D. The rate loss term is normally the estimated entropy of the quantized latent representation, which indicates the number of bits necessary to represent the encoded symbols, for example, bits-per-pixel (bpp).

For lossless video/image compression, the video coding system 600 contains only the probability model 603, the arithmetic encoder 605 and the arithmetic decoder 606. The system loss function contains only the rate loss, since the distortion loss is always zero, in other words, no loss of information.

Fundamentals of Entropy Encoding and Probability Model

Entropy encoding is a lossless data compression technique used in video codecs such ITU-T H.263 and H.264. It compresses data by replacing each fixed-length input symbol with the corresponding variable-length prefix-free output codeword. When using entropy-based encoding, the length of each encoded codeword is approximately proportional to the negative logarithm of the probability of the symbol. According to Shannon's source coding theorem, the optimal code length for a symbol is $\log_b P$, where b is the number of symbols to make output codes, for example, 2 in normal video/image compression system, and P is the probability of the input symbol. Arithmetic coding is a form of entropy coding techniques that has been widely used for its simplicity and compression efficiency.

Context-adaptive binary arithmetic coding (CABAC) is the entropy coding method adopted in the H.264/MPEG-4 AVC and HEVC standards. CABAC is based on arithmetic encoding algorithm. It binarizes the input symbols if the they are not in binary format. The probability of an input bin or bit is based on local context since the bins are normally correlated well locally and the probability model is updated adaptively as the encoding and decoding proceed.

In a neural network-based end-to-end video coding system, the probability model works together with the arithmetic codec to perform lossless compression of the latent representation of the input video. The probability model can be implicit or explicit.

An implicit probability model assumes symbols to be encoded are mutually independent and can be described by a predefined parametric or nonparametric distribution function. The probability model behaves as an entropy bottleneck during the training, which guides the amount of information contained in the quantized latent representation. At inference stage, for example encoding/decoding stage, extra context information is often required to improve the compression by removing the correlation in the latent representation space. The extra context information is sent by an extra bitstream from encoder to decoder either uncompressed or compressed using a different method.

On the other hand, an explicit probability model does not assume the independence of the data in the quantized latent representation. It applies a deep neural network to estimate the probability distribution of the symbols to be encoded/decoded with the help of already available information. For example, an autoregressive probability model builds context from neighboring pixels that have already been available at encoding/decoding stage. A masked convolutional neural network (CNN) may be used in the probability model to guarantee no future information is leaked to the context. At encoding and decoding stage, the elements in the quantized latent representation are processed one by one and the estimated distribution is used by the arithmetic codec to encode/decode the symbols. To improve the encoding and decoding efficiency, the system can perform in a batch mode, where the context is updated once a batch of elements have been processed. For example, for multi-scale lossless image compression, the system first constructs a series of downsampled low-resolution images from an input image. A low-resolution image is used as the context to estimate the distribution of the pixels in a high-resolution image. This procedure repeats in multiple scales until the original input image is encoded/decoded. In another similar approach, instead of using downsampled image as context, the system learns a low-resolution representation using deep neural networks.

For simplicity, we assume the system performs lossless image compression in the rest of the description. The proposed method can be extended to lossless/lossy video compression naturally by treating the temporal dimension similar to the spatial dimensions. Since our focus is on the probability model, the term "input image" is used to represent the quantized latent representation in an end-to-end video compression system. The term "pixel" is used to represent an element in the quantized latent representation.

The autoregressive probability model described in previous paragraphs, which encodes/decodes pixels one by one, makes usage of the already available information and normally performs well with regards to the compression rate. However, probability estimation using deep neural networks requires massive computational resources and the encoding/decoding procedure is very slow since the pixels can only be processed sequentially. On the other hand, the multi-scale probability model addresses this problem by processing pixels in a few number of batches. It first downsamples the input image to a series of low resolution images and then using the low resolution images as context to predict pixels in a high resolution image. This procedure repeat until the original input image is encoded/decoded. However, the existing multi-scale methods use a fixed pattern that defines the order or processing order in which the pixels are to be processed. This design has, at least, the following features:

The encoding/decoding order is predefined and cannot be updated according to the content of the input image. The predefined order may not achieve the best compression performance The number of progressive steps is fixed by the predefined pattern. Thus, the method cannot be extended or be adapted according to the content of the input image. Increasing the number of steps can greatly improve compression performance without dramatically increasing the computational complexity.

Various embodiments described herein propose a guided progressive multi-resolution probability model/system that significantly improves the performance of the existing multi-scale probability models by introducing a flexible mechanism so that the encoding/decoding order of building blocks of media item and the number of steps in each scale can be determined by the probability model according to the content of the media item. In some embodiments, the guided progressive multi-resolution probability model may be referred to as a guided probability model, a guided multi-scale probability model, or a guided multi-resolution probability model.

For simplicity, various embodiments are herein described with image and/or video as example of the media item; and pixels as examples of the building blocks of the media item. However, it would be understood that the embodiments are applicable to other media items as well. In one example, various embodiments are applicable to any N×M×P dimensional discrete signal which has an exploitable probability distribution model for reordering the discrete elements for better compressibility/representability. N×M×P could be an image of size N×M and 3 values per pixel (R,G,B), or it could be an image-like representation of a higher dimensional discrete signal transmitted over the 5G network, which may further be compressed by exploiting the probability model. In another example, the media item may include input data with local structure to exploit, such as in feature maps, in spectrograms, or in time domain audio signals.

The proposed method and system are based on the multi-scale approach that processes an input image in several resolutions. Lower-resolution images are used as context to estimate parameters of a distribution model for pixels in a higher-resolution image. At each scale, the pixels in the high-resolution image are processed in multiple steps. At each step, a batch of pixels is encoded/decoded by arithmetic encoder/decoder using the estimated parameters of the distributions model based on the current context. After the batch is processed, the pixels are added to the current context.

Some of the features of the proposed system includes, but are not limited to:

The proposed system incorporates a binary mask that indicates the pixels' availability at each processing step. The binary mask and the current context are given as the input to a deep neural network to estimate the parameters of the probability.

The proposed system determines the encoding/decoding order at each scale by a predefined metric that evaluates the compressibility of each pixel. The metric can be, but not limited to, estimated entropy, an upper or lower-bound of the entropy, the number of available pixels in the neighboring area, the pattern of available pixels in the neighboring area, or the combination of any of these metrics.

In the proposed system, at each scale, the high-resolution image can be partitioned into blocks, and encoding/decoding order can be defined within a block according to the predefined metric.

In the proposed system, number of scales and the number of steps at each scale can be predefined fixed values, determined by a predefined strategy, or determined by the probability model at the encoding stage according to the content of the input image. In the latter case, the strategy, for example, the chosen metric, ascending/descending order, the number of steps, and block mode, is included in the output bitstream and signaled to the decoder.

Multi-Scale Probability Model

Following embodiments describe a method, computer program product and system that are based on a multi-scale probability model approach.

Figure 7:
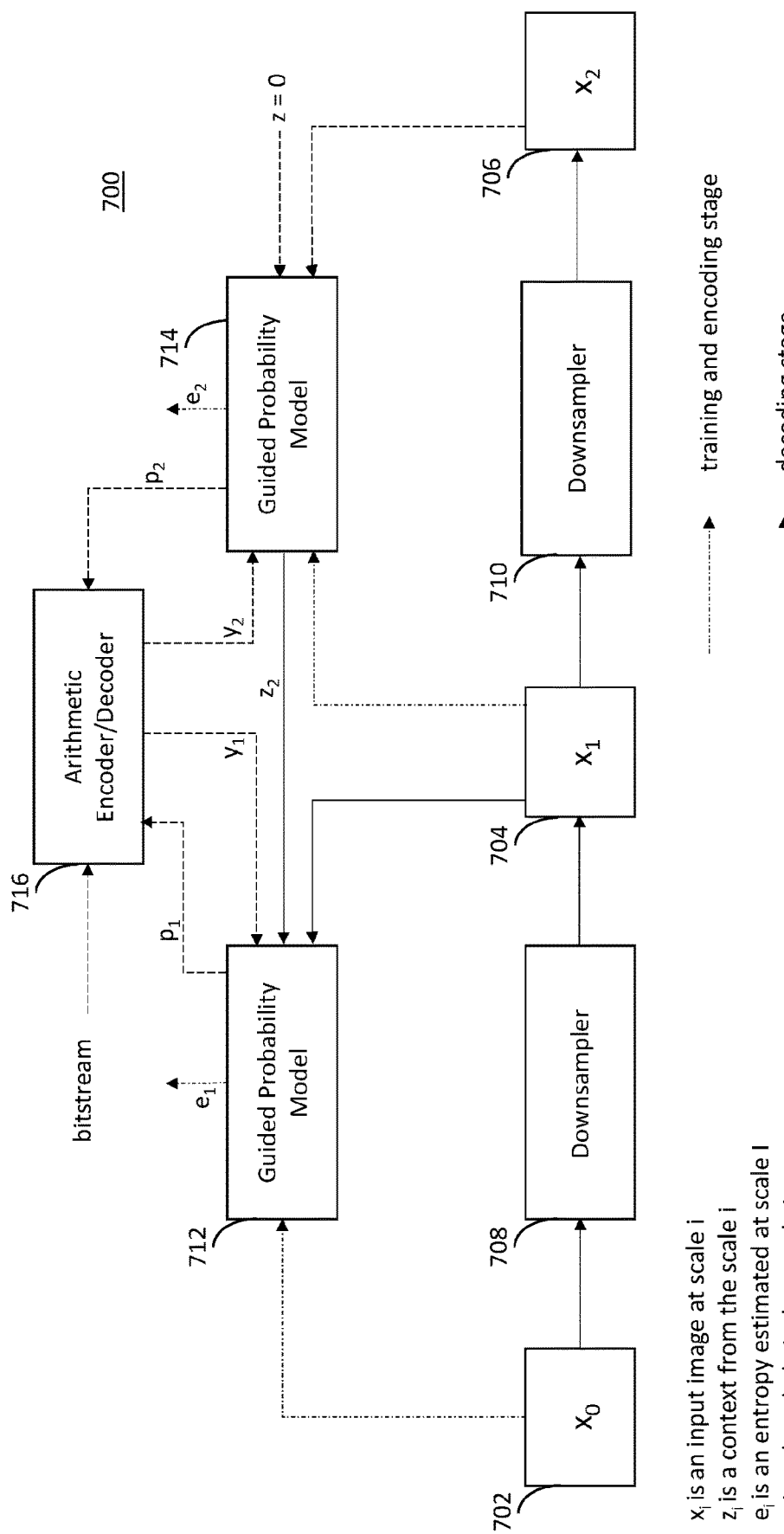
FIG. 7 illustrates an example system to implement a guided probability model with 2 scales.

FIG. 7 illustrates an example system 700 with 2 scales. The number of scales can be predefined or determined by the probability model during the encoding stage. In the latter case, the number is encoded in the bitstream and signaled to the decoder. In some embodiments, the system may work differently in training, encoding, and decoding stages. Following paragraphs describe how the system 700 works in each stage, according to an example embodiment. Though the embodiment is explained with help of 2 scale, the embodiment may be applicable or expanded for other scales as well.

Training Stage

At the training state, the input of the system 700 is an original image $x_0$ 702. In some embodiments, the original image may also be referred to as input image. The original image $x_0$ 702 is first downsampled into two scales $x_1$ 704 and $x_2$ 706. For example, the original image $x_0$ 702 is downsampled to low resolution image $x_1$ 704 by a downsampler 708; and the image $x_1$ 704 is downsampled to the image $x_2$ 706 by a downsampler 710. In an embodiment, the nearest neighbor downsampling method is used so that a part of the pixels in a high-resolution image can be directly recovered from the low-resolution image in the previous scale. This design avoids using extra bits to encode round errors when averaging-based downsampling or interpolation-based downsampling is used.

At scale i, the guided probability model component takes context $z_{(i+1)}$ from scale i+1 and image at $x_i$ as its input. The output of this component is the estimated entropy, which indicates the number of bits in the output bitstream, of the pixels in $x_{(i-1)}$. For example, at scale 1, a guided probability model 712 receives context $z_2$ and the image $x_1$ 704 as input; and outputs estimated entropy e1 of the pixels in the image $X_0$ 702. Similarly, at scale 2, a guided probability model 714 receives context z as an input; and outputs estimated entropy $e_2$ of the pixels in the image $X_1$ 704. Value of context Z is zero in the example with 2 scales. Note that part of the pixels in $x_{(i-1)}$ can be directly recovered from $x_i$ since the nearest neighbor downsampling method is used. The guided probability model component also outputs context $z_i$, which then can be used by higher resolution scales. For example, the guided probability model 714 outputs context $z_2$, which can be used by the image $x_1$ 704. The sum of the entropies returned at each scale indicates the total number of bits required to encode input image $x_0$. For example, sum of the entropies $e_1$, $e_2$, and the number of bits of image $x_2$ indicates the total number of bits required to encode the input image $x_0$ 702.

In this example, scale 2 is the highest scale, in other words, the lowest resolution scale, there is no context available for scale 2. Accordingly, a context z is set to zero. As the image $x_2$ 706 is not compressed by the system 700, total number of bits for the image $x_2$ 706 is added to the total entropy.

Encoding Stage

At the encoding stage, the system 700 works in a similar manner as in the training stage except that the guided probability model component outputs the parameters of predefined distribution function for the pixels to be encoded. For example, at scale 1, the guided probability model 712 receives context $z_2$ and image $x_1$ 704 as input; and outputs estimated value distributions $p_1$ of the pixels in the image $X_0$ 702. Similarly, at scale 2, the guided probability model 714 receives context z as an input; and outputs estimated value distributions $p_2$ of the pixels in the image $x_1$ 704. Value of context Z is zero in the example with 2 scales.

Image $x_2$ is first added to the bitstream by an arithmetic codec 716 (encoder/decoder) without compression or encoding, for example, using a uniform distribution function. The arithmetic codec may also be referred to as an arithmetic encoder/decoder in some embodiments. Further, the arithmetic codec 716 may be referred to as the arithmetic encoder 716 in the encoding stage and arithmetic decoder in the decoding stage. Then, at scale i, the arithmetic encoder 716 uses the estimated value distribution from the guided probability model to encode image $x_{(i-1)}$ and adds the bits to the output bitstream. Pixels that can be directly inferred from a lower scale image are not encoded by the arithmetic encoder. The images are encoded in the order of the images $x_2$ 706, $x_1$ 704, and $x_0$ 702. For example, the arithmetic encoder 716 encodes the image $x_1$ 704 by using estimated value distribution $p_2$ and encodes the image $x_0$ 702 using the estimated value distribution $p_1$. As suggested above, the image $x_2$ 706 is added to stream without compression or encoding. In some embodiments, the estimated value distribution may be referred to as estimated distribution function.

Decoding Stage

At the decoding stage, the arithmetic decoder 716 directly decodes the image $x_2$ 706 from the given bitstream, as $x_2$ is not compressed or encoded. Then, the images are decoded one by one in multiple scales. At scale i, the guided probability model component uses $z_{(i+1)}$ and $x_i$ as input to estimate a distribution function of the pixels in $x_{(i-1)}$. The estimated distribution functions are used by arithmetic decoder to decode the corresponding image. The procedure repeats until image $x_{-0}$ is decoded. For example, the arithmetic decoder 716 decodes the image $x_1$ 704 by using estimated value distribution $p_2$ and provides a decoded image $y_2$ as an output. Similarly, the arithmetic decoder 716 decodes the image $x_0$ 702 by using the estimated value distribution $p_1$ and provides decoded image $y_1$ as an output. As suggested above, the arithmetic decoder 716 directly decodes the image $x_2$ 706.

Figure 8:
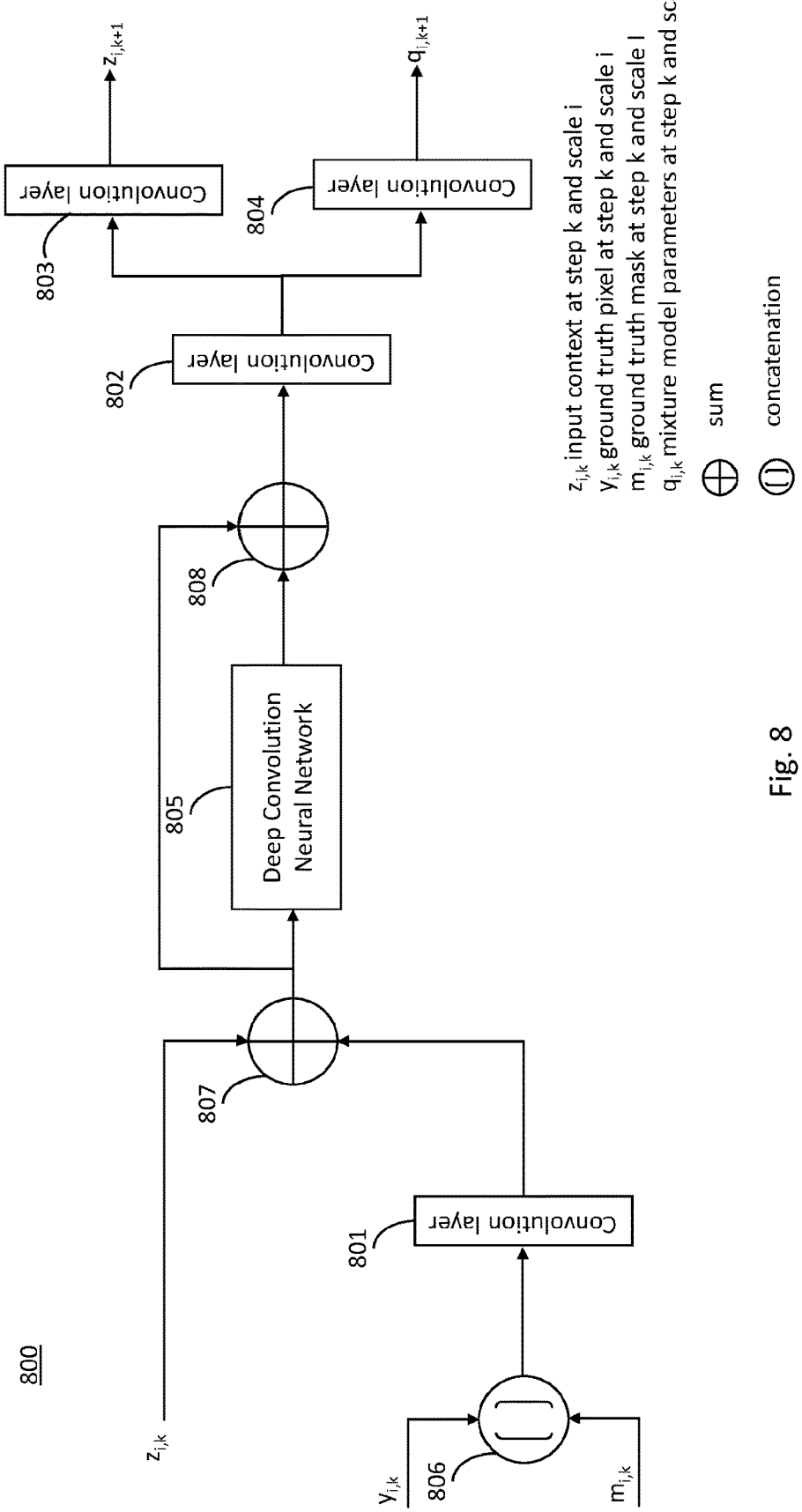
FIG. 8 depicts an example architecture of a guided probability model, in accordance with an embodiment.

FIG. 8 depicts an example architecture of a guided probability model 800, in accordance with an embodiment. At scale i, pixels are encoded and decoded in batches. After a batch of pixels is encoded/decoded, they are given to the guided probability model component to encode/decode the next batch of pixels. To make the system flexible, a masking mechanism that indicates the availability of the pixels is designed.

The guided probability model 800 takes three inputs, for example, $z_{i,k}$, $y_{i,k}$ and $m_{i,k}$. $z_{i,k}$ is the context tensor at step k and scale i; $y_{i,k}$ is the ground truth image at step k and scale i; and $m_{i,k}$ is the binary mask at step k scale i. The guided probability model 800 has two outputs, for example, $z_{i,k+1}$ and $q_{i,k+1}$. $z_{i,k+1}$ is the output context, and $q_{i,k+1}$ is the parameters of the distribution function for pixels to be encoded/decoded. In this embodiment, the guided probability model 800 is shown to include convolution layers 801, 802, 803, and 804; a deep convolution neural network 805; a concatenation function 806; and summation functions 807 and 808. However, it should be understood, that the guided probability model 800 may include other combinations of convolution layers, deep convolution neural network, concatenation function and summation function.

At the first step, $z_{i,1}$ is set equal to $z_{i+1,K}$, where K is the total number of steps in each scale, except the last scale where z is set to zero; $y_{i,1}$, which is a tensor of the same size as image $x_{i-1}$, is set to be the upsampled image from $x_i$; and $m_{i,1}$ to be a tensor of the same size is set as $x_{i-1}$ where the positions of the pixels that are directly inferred from $x_i$ are set to one and the rest are set to zero.

After a batch of pixels is encoded/decoded, the values in $y_{i,k}$ are updated and the corresponding positions in $m_{i,k}$ are set to one.

Pixel Encoding/Decoding Order

An example order is illustrated in the following table, table 1:

TABLE 1

| 1 | 2 | 1 | 2 | 1 | 2 |
|---|---|---|---|---|---|
| 3 | X | 3 | X | 3 | X |
| 1 | 2 | 1 | 2 | 1 | 2 |
| 3 | X | 3 | X | 3 | X |
| 1 | 2 | 1 | 2 | 1 | 2 |

In table 1, X indicates the pixels that are directly inferred from the lower resolution image. The pixels are encoded/decoded in three batches, following the order indicated by the corresponding number, for example, first pixel labelled as 1, then pixel labelled as 2, then pixel labelled as 3. The order is predefined and cannot be adapted according to the content of the image and the number of steps is fixed.

In the proposed system, a binary mask is used to indicate the availability of pixels at each step. Thus, it's possible to incorporate a flexible encoding/decoding order and the number of steps at each scale is not fixed.

Next, some example methods that determine the encoding/decoding orders are described.

Entropy-Based Order

The order can be determined based on the estimated entropy of the pixels to be processed. In case when the estimation is difficult or expensive, an upper or lower-bound of the entropy can be used. Given the estimated entropies or upper/lower bound of the entropies, the pixels are partitioned into batches, and these batches are processed one batch after another. After a batch of pixels is processed, the entropy or the upper/lower bound can be estimated again using the updated context.

For example, the following table, table 2, shows the estimated entropies of unprocessed pixels, where 'X' indicates the available pixels and numeral values indicates estimated entropies.

TABLE 2

| 0.3 | 0.2 | 0.2 | 0.1 | 0.8 | 2.5 |
|---|---|---|---|---|---|
| 0.2 | X | 0.6 | X | 3.0 | X |
| 1.2 | 2 | 0.8 | 1.4 | 1.2 | 2.0 |
| 1.3 | X | 1.0 | X | 1.3 | X |
| 2.1 | 2.2 | 1.2 | 1.5 | 3.2 | 3.5 |

Suppose the system has a strategy to encode/decode pixels in the descending order of the estimated entropies and process the pixels in 2 batches. The median value of all the estimated entropy values is first calculated, which is 1.25 for this example. The pixels having entropy values higher than the median value are processed in the first batch. The rest of the pixels are processed in the second batch. The encoding/decoding order is shown in the next table, table 3, where the number indicates the ordering index.

TABLE 3

| 2 | 2 | 2 | 2 | 2 | 1 |
|---|---|---|---|---|---|
| 2 | X | 2 | X | 1 | X |
| 2 | 1 | 2 | 1 | 2 | 1 |
| 1 | X | 2 | X | 1 | X |
| 1 | 1 | 2 | 1 | 1 | 1 |

As an example, an upper-bound of the entropies of the mixture of logistics distribution can be used as the metric to determine the encoding/decoding order. The upper-bound can be calculated using the following equation:

$$H(X) = \Sigma_i \pi_i \log \pi_i + \Sigma_i \pi_i (\ln s_i + 2) \qquad \text{equation 3}$$

In equation 3, H(X) is the upper-bound of the entropy of the mixture model, $\pi_i$ is the weight of mixture i, and $s_i$ is the scale of the logistic distribution of mixture i. $\pi_i$ and $s_i$ are the parameters that are estimated by the guided probability model component.

An alternative way to infer the entropy is to use the high frequency components of the low-resolution image. This could be achieved by, for example, using DCT transform and a cut-off frequency that could be optimized meanwhile at encoding stage.

In one additional or alternative embodiment, an additional neural network may be used to estimate the entropy, where this additional neural network has been previously trained by any suitable technique.

Pixel Availability-Based Order

The encoding/decoding order can be determined by the number of pixels or the pattern of pixels that are available in the neighboring area at the current state. For example, the following table, table 4, shows the number of available pixels in the 3×3 neighboring area of each unprocessed pixel. "X" indicates available pixels, and the number indicates the number of available pixels in the 3×3 neighborhood. Note that we use float numbers in the table to differentiate with the index values in other tables.

TABLE 4

| X | 2.0 | X | 2.0 | X | 2.0 | X |
|---|---|---|---|---|---|---|
| 2.0 | 4.0 | 2.0 | 4.0 | 2.0 | 4.0 | 2.0 |
| X | 2.0 | X | 2.0 | X | 2.0 | X |
| 2.0 | 4.0 | 2.0 | 4.0 | 2.0. | 4.0 | 2.0 |
| X | 2.0 | X | 2.0 | X | 2.0 | X |

According to table 4, pixels that have 4 available neighboring pixels are processed first, and the table is updated after each set of pixels is processed.

The final encoding/decoding order is shown in the following table, table 5, where numerals represents the order index.

TABLE 5

| X | 4 | X | 3 | X | 4 | X |
|---|---|---|---|---|---|---|
| 4 | 1 | 2 | 1 | 2 | 1 | 4 |
| X | 2 | X | 2 | X | 2 | X |
| 4 | 1 | 2 | 1 | 2 | 1 | 4 |
| X | 4 | X | 3 | X | 4 | X |

Ordering in Blocks

The input image can be partitioned into blocks, and the encoding/decoding order can be applied to the pixels in each block. Pixels that have the same ordering index are processed at the same batch. For example, the following table, table 6, shows the order when the input image is partitioned into 2×4 blocks.

TABLE 6

| 5 | 3 | 2 | 4 | 5 | 3 | 2 | 4 |
|---|---|---|---|---|---|---|---|
| 6 | X | 1 | X | 6 | X | 1 | X |
| 5 | 3 | 2 | 4 | 5 | 3 | 2 | 4 |
| 6 | X | 1 | X | 6 | X | 1 | X |

Decoder Signaling

Note that the encoding/decoding strategy, for example, the chosen metric, ascending/descending order, block mode, and the number of batches, can be determined at the encoding stage according to the content of the image and signaled to the decoder.

In an alternate embodiment, other than determining the encoding/decoding order using a predefined metric, the guided probability model component can be trained to predict the order. This can be achieved by letting the guided probability model output either an estimated entropy map or a binary mask that indicates the next set of pixels to be encoded/decoded.

Figure 9:
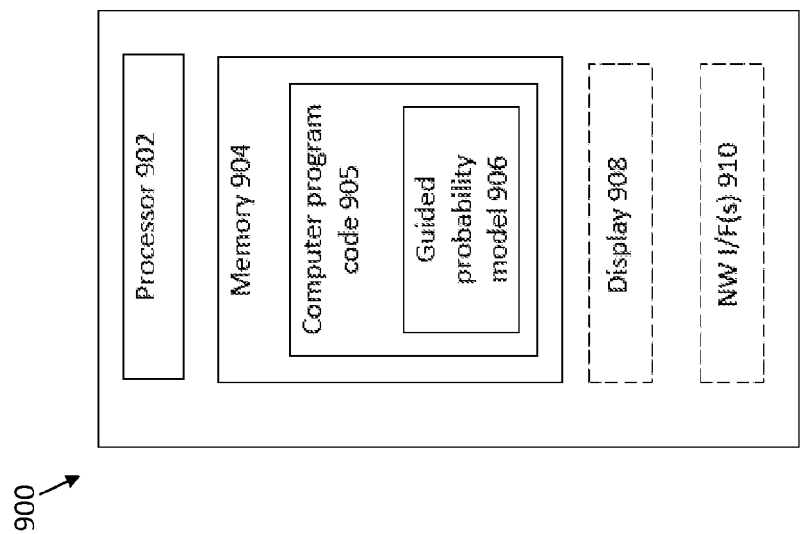
FIG. 9 is an example apparatus configured to implement the guided probability model for a compressed representation of neural networks.

FIG. 9 is an example apparatus 900, which may be implemented in hardware, configured to implement a guided probability model for a compressed representation of neural networks, based on the examples described herein. The apparatus 900 comprises a processor 902, at least one non-transitory memory 904 including computer program code 905, wherein the at least one memory 904 and the computer program code 905 are configured to, with the at least one processor 902, cause the apparatus to implement a guided probability model 906 for a compressed representation of neural networks. The apparatus 900 optionally includes a display 908 and one or more network (NW) interfaces (I/F(s)) 910. The NW I/F(s) 910 may be wired and/or wireless and communicate over the Internet/other network(s) via any communication technique. The NW I/F(s) 910 may comprise one or more transmitters and one or more receivers.

Figure 10:
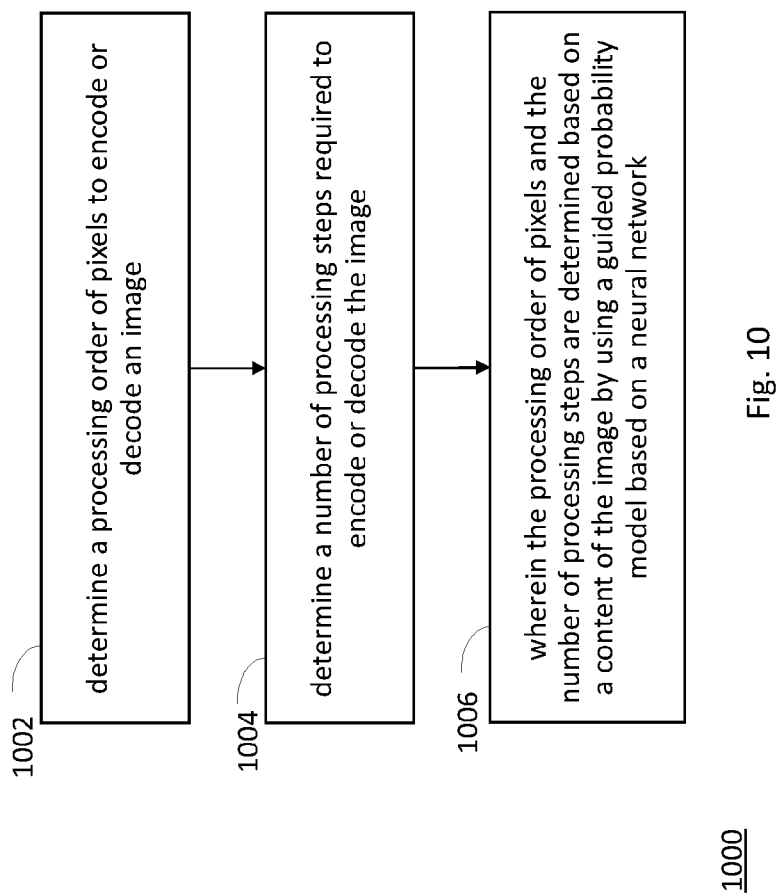
FIG. 10 is an example method to implement the guided probability model for a compressed representation of neural networks.

FIG. 10 is an example method 1000 to implement a guided probability model for a compressed representation of neural networks. At 1002, the method includes determining a processing order of pixels to encode or decode an image. At 1004, determine a number of processing steps required to encode or decode the image. At 1006, the method includes wherein the processing order of pixels and the number of processing steps are determined based on a content of the image by using a guided probability model based on a neural network.

In an embodiment, the guided probability model comprises a multi-scale probability model, and the method 1000 further includes determine the processing order of the pixels and the number of processing steps at each scale in the multi-scale probability model. In another embodiment, the method 1000 includes processing an input image into a plurality of resolutions. Lower resolution images are used to as a context to estimate parameters of a distribution model for pixels in a higher resolution image. In yet another embodiment, number of scales in the multi-scale probability model is based on the plurality of resolutions.

Figure 11:
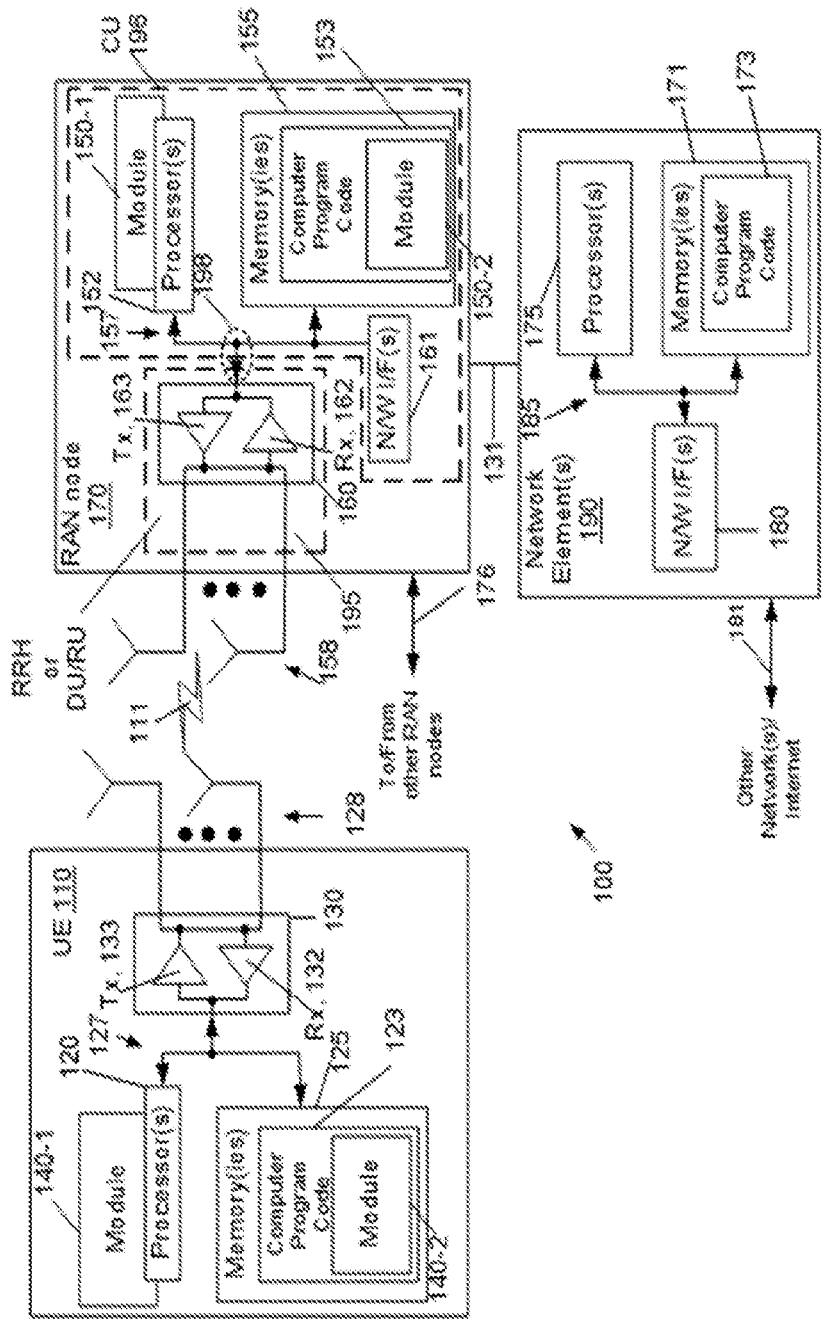
FIG. 11 is a block diagram of one possible and non-limiting system in which the example embodiments may be practiced.

Turning to FIG. 11, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, for example, link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (for example, a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (for example, the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or more of modules 140-1, 140-2, 150-1, and 150-2 may be configured to implement a guided probability model for a compressed representation of neural networks based on the examples described herein. Computer program code 173 may also be configured to implement a guided probability model for a compressed representation of neural networks based on the examples described herein.

An example apparatus includes at least one processor; at least one non-transitory memory including computer program code; wherein the at least one memory and the computer program code are configured to, with the at least one processor, cause the apparatus at least to perform: determine a processing order of building blocks of media item to encode or decode an media item; and determine a number of processing steps required to encode or decode the media item; wherein the processing order of building blocks of media item and the number of processing steps are determined based on a content of the media item by using a guided probability model based on a neural network.

The apparatus may further include, wherein the guided probability model comprises a multi-scale probability model, and wherein the apparatus is further caused to determine the processing order of the building blocks of media item and the number of processing steps at each scale in the multi-scale probability model.

The apparatus may be further caused to process an input media item into a plurality of resolutions, and wherein lower resolution media items are used to as a context to estimate parameters of a distribution model for building blocks of media item in a higher resolution media item.

The apparatus may further include, wherein a number of scales in the multi-scale probability model is based on the plurality of resolutions.

The apparatus may further include, wherein at each scale in the multi-scale probability model, the apparatus is further caused to: process building blocks of media item in a high-resolution media item in one or more processing steps.

The apparatus may further include, wherein at each processing step of the one or more processing steps, the apparatus causes an arithmetic encoder/decoder to encode or decode a batch of building blocks of media item based on an estimated distributions.

The apparatus may further include, wherein the apparatus further is caused to add the batch of building blocks of media item to a current context after the batch of building blocks of media item is processed.

The apparatus may be further caused to incorporate a binary mask to indicate building blocks of media item available for processing at each processing step of the one or more processing steps.

The apparatus may be further caused to provide a binary mask and a current context as an input to the guided probability model to estimate parameters of probability, and wherein the binary mask indicates building blocks of media item available for processing at each processing step of the one or more processing steps.

The apparatus may further include, wherein at the each scale in the multi-scale probability model, the apparatus is further caused to: determine the processing order to encode or decode building blocks of media item of the media item at the each scale based on a predefined metric that evaluates compressibility of the building blocks of the media item.

The apparatus may be further caused to signal a number of scales in the multi-scale probability model in a bitstream to a decoder.

The apparatus may be further caused to train the guided probability model.

The apparatus may further include, wherein an original media item is provided as an input to the guided probability model.

The apparatus may be further is further caused to downsample the original media item into multi-scales.

The apparatus may further include, wherein, at scale i, the apparatus is further caused to provide a context at scale i+1 and a media item at scale i as an input to the guided probability model, wherein i is a whole number.

The apparatus may further include, wherein a sum of entropies returned at each scale of the multi-scales specifies a total number of bits required to encode the original media item.

The apparatus may further include, wherein to encode the building blocks of media item, the apparatus causes the guided probability model to estimate parameters of a predefined distribution function for the building blocks of media item to be encoded.

The apparatus may further include, wherein building blocks of the media item that are capable of being inferred from a lower scale are not encoded by an arithmetic encoder.

The apparatus may further include, wherein at scale i of the multi-scale probability model, the apparatus further causes the arithmetic encoder to encode a media item at scale i−1 based on the estimated parameters of the predefined distribution function at scale i, and wherein i is whole number.

The apparatus may further include, wherein the syntax definitions further comprise element to support the storage and signaling of ONNX-defined messages and formats via the syntax definitions.

The apparatus may further include, wherein to decode the media item, the apparatus is further caused to decode media items one by one at each scale of the multi-scale model, and
wherein a media item at highest scale is decoded directly from a bitstream.

The apparatus may further include, wherein at scale i, the apparatus causes the guided probability model to use a context at scale i+1 and the media item at scale i as an input to estimate parameters of a distribution function of building blocks of media item in a media item at scale i−1, wherein i is a whole number.

The apparatus may further include, wherein the apparatus causes an arithmetic decoder to decode the media item at scale i based on the estimated parameters of the distribution function.

The apparatus may further include, wherein the building blocks of the media item include pixels; and the media item includes an image and/or a video.

The apparatus may be further caused to train the guided probability model to predict the processing order of the building blocks of media item to encode or decode the media item.

An example method includes: determining a processing order of building blocks of media item to encode or decode a media item; and determining a number of processing steps required to encode or decode the media item; wherein the processing order of building blocks of media item and the number of processing steps are determined based on a content of the media item by using a guided probability model based on a neural network.

The example method may further include, wherein the guided probability model comprises a multi-scale probability model, and wherein the method further comprises determining the processing order of the building blocks of media item and the number of processing steps at each scale in the multi-scale probability model.

The example method may further include comprising processing an input media item into a plurality of resolutions, and wherein lower resolution media items are used as a context to estimate parameters of a distribution model for building blocks of media item in a higher resolution media item.

The example method may further include, wherein a number of scales in the multi-scale probability model is based on the plurality of resolutions.

The example method may further include, wherein at each scale in the multi-scale probability model, and wherein the method further comprises processing building blocks of media item in a high-resolution media item in one or more processing steps.

The example method may further include, wherein at each scale in the multi-scale probability model, the method further include partitioning the high-resolution media item into one or more blocks; and defining the processing order to encode or decode building blocks of media item within a block of the one or more blocks based on a predefined metric.

The example method may further include, wherein at each processing step of the one or more processing steps, the method further comprises encoding or decoding, by an arithmetic encoder/decoder, a batch of building blocks of media item based on an estimated distributions.

The example method may further include adding the batch of building blocks of the media item to a current context after the batch of building blocks of media item is processed.

The example method may further include incorporating a binary mask to indicate building blocks of media item available for processing at each processing step of the one or more processing steps.

The example method may further include providing a binary mask and a current context as an input to the guided probability model to estimate parameters of probability, and wherein the binary mask indicates building blocks of media item available for processing at each processing step of the one or more processing step.

The example method may further include, wherein at the each scale in the multi-scale probability model, the method further comprises determining the processing order to encode or decode building blocks of media item of the media item at the each scale based on a predefined metric that evaluates compressibility of the building blocks of media item.

The example method may further include signaling a number of scales in the multi-scale probability model in a bitstream to a decoder.

The example method may further include training the guided probability model.

The example method may further include, wherein an original media item is provided as an input to the guided probability model.

The example method may further include downsampling the original media item into multi-scales.

The example method may further include, wherein, at scale i, the method further comprises providing a context at scale i+1 and a media item at scale i as an input to the guided probability model, wherein i is a whole number.

The example method may further include, wherein a sum of entropies returned at each scale of the multi-scales specifies a total number of bits required to encode the original media item.

The example method may further include, wherein to encode the building blocks of media item, the method further comprises estimating, by the guided probability model, parameters of a predefined distribution function for the building blocks of media item to be encoded.

The example method may further include, wherein building blocks of media item that are capable of being inferred from a lower scale are not encoded by an arithmetic encoder.

The example method may further include, wherein at scale i of the multi-scale probability model, the method further comprises encoding, by the arithmetic encoder, a media item at scale i−1 based on estimated parameters of the predefined distribution function at scale i, and wherein i is whole number.

The example method may further include, wherein to decode the media item, the method further comprises decoding media items one by one at each scale of the multi-scale model, and wherein a media item at highest scale is decoded directly from a bitstream.

The example method may further include, wherein at scale i, the method further comprises using, by the guided probability model, a context at scale i+1 and a media item at scale i as an input to estimate parameters of a distribution function of building blocks of media item in a media item at scale i−1, wherein i is a whole number.

The example method may further include decoding, by an arithmetic decoder, the media item at scale i based on the estimated parameters of the distribution function.

The example method may further include training the guided probability model to predict the processing order of the building blocks of media item to encode or decode the media item.

The example method may further include, wherein the building blocks of the media item include pixels; and the media item includes an image and/or a video.

An example non-transitory program storage device readable by a machine, tangibly embodying a program of instructions executable by the machine for performing operations, the operations including: determining a processing order of building blocks of media item to encode or decode a media item; and determining a number of processing steps required to encode or decode the media item; wherein the processing order of building blocks of media item and the number of processing steps are determined based on a content of the media item by using a guided probability model based on a neural network.

An another example apparatus includes means for determining a processing order of building blocks of media item to encode or decode a media item; and means determining a number of processing steps required to encode or decode the media item; wherein the processing order of building blocks of media item and the number of processing steps are determined based on a content of the media item by using a guided probability model based on a neural network.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   at least one processor; and
   at least one memory storing instructions that, when executed by the at least one processor, cause the apparatus to perform at least the following:
   performing a process to encode or decode a media item, the process comprising:
   determine a processing order of building blocks of a media item to encode or decode the media item, the determining the processing order comprises incorporating a binary mask to indicate the building blocks available for processing at individual processing steps of one or more processing steps;

determine a number of the one or more processing steps, used to process at least the building blocks via the processing order, required to encode or decode the media item, wherein the processing order of the building blocks and the number of the one or more processing steps are determined based on a content of the media item by using a guided probability model, having inputs comprising the binary mask, based on a neural network, wherein the binary mask is input directly into the guided probability model; and performing the processing at least the building blocks via the processing order to encode or decode the media item.

2. The apparatus of claim 1, wherein the guided probability model comprises a multi-scale probability model, and wherein the at least one memory further stores instructions that, when executed by the at least one processor, causes the apparatus to perform at least the following: determine the processing order of the building blocks and the number of the one or more processing steps at each scale in the multi-scale probability model.

3. The apparatus of claim 2, wherein the at least one memory further stores instructions that, when executed by the at least one processor, causes the apparatus to perform at least the following: process an input media item into a plurality of resolutions, and wherein lower resolution media items are used as a context to estimate parameters of a distribution model for building blocks in a higher resolution media item.

4. The apparatus of claim 3, wherein at each scale in the multi-scale probability model, the at least one memory further stores instructions that, when executed by the at least one processor, causes the apparatus to perform at least the following:

partition the higher resolution media item into one or more blocks; and define the processing order to encode or decode building blocks within a block of the one or more blocks based on a predefined metric.

5. The apparatus of claim 1, wherein the at least one memory further stores instructions that, when executed by the at least one processor, causes the apparatus to perform at least the following: provide a binary mask and a current context as an input to the guided probability model to estimate parameters of probability, and wherein the binary mask indicates the building blocks available for processing at each processing step of the number of the one or more processing steps.

6. The apparatus of claim 2, wherein at the each scale in the multi-scale probability model, the at least one memory further stores instructions that, when executed by the at least one processor, causes the apparatus to perform at least the following: determine the processing order to encode or decode the building blocks of the media item at the each scale based on a predefined metric that evaluates compressibility of the building blocks of the media item.

7. The apparatus of claim 2, wherein the at least one memory further stores instructions that, when executed by the at least one processor, causes the apparatus to perform at least the following: signal, in a bitstream to a decoder, one or more of the following: a number of scales in the multi-scale probability model; a chosen metric that evaluates compressibility of individual pixels of the media item; one of an ascending or descending order defined at least within a block of the media item; or a number of batches in which pixels are encoded or decoded.

8. The apparatus of claim 2, wherein the media item comprises an image or a video, and wherein the building blocks comprises pixels.

9. A method comprising:

performing a process to encode or decode a media item, the process comprising:

determining a processing order of building blocks of the media item to encode or decode the media item, the determining the processing order comprises incorporating a binary mask to indicate the building blocks available for processing at individual processing steps of one or more processing steps;

determining a number of the one or more processing steps, used to process at least the building blocks via the processing order, required to encode or decode the media item, wherein the processing order of the building blocks and the number of the one or more processing steps are determined based on a content of the media item by using a guided probability model, having inputs comprising the binary mask, based on a neural network, wherein the binary mask is input directly into the guided probability model; and performing the processing at least the building blocks via the processing order to encode or decode the media item.

10. The method of claim 9, wherein the guided probability model comprises a multi-scale probability model, and wherein the method further comprises determining the processing order of the building blocks and the number of the one or more processing steps at each scale in the multi-scale probability model.

11. The method of claim 10 further comprising processing an input media item into a plurality of resolutions, and wherein lower resolution media items are used as a context to estimate parameters of a distribution model for building blocks in a higher resolution media item.

12. The method of claim 11, wherein at each scale in the multi-scale probability model, the method further comprises:

partitioning the higher resolution media item into one or more blocks; and defining the processing order to encode or decode building blocks within a block of the one or more blocks based on a predefined metric.

13. The method of claim 9 further comprising providing a binary mask and a current context as an input to the guided probability model to estimate parameters of probability, and wherein the binary mask indicates the building blocks available for processing at each processing step of the number of the one or more processing steps.

14. The method of claim 10, wherein at the each scale in the multi-scale probability model, the method further comprises determining the processing order to encode or decode building blocks of the media item at the each scale based on a predefined metric that evaluates compressibility of the building blocks.

15. The method of claim 10 further comprising signaling, in a bitstream to a decoder, one or more of the following: a number of scales in the multi-scale probability model; a chosen metric that evaluates compressibility of individual pixels of the media item; one of an ascending or descending order defined at least within a block of the media item; or a number of batches in which pixels are encoded or decoded.

16. The method of claim 10, wherein the media item comprises an image or a video, and wherein the building blocks comprises pixels.

17. A non-transitory program storage device readable by a machine, tangibly embodying a program of instructions executable by the machine for performing operations, the operations comprising:
> performing a process to encode or decode a media item, the process comprising:
> determining a processing order of building blocks to encode or decode a media item, the determining the processing order comprises incorporating a binary mask to indicate the building blocks available for processing at individual processing steps of one or more processing steps;
> determining a number of the one or more processing steps, used to process at least the building blocks via the processing order, required to encode or decode the media item;
> wherein the processing order of the building blocks and the number of the one or more processing steps are determined based on a content of the media item by using a guided probability model, having inputs comprising the binary mask, based on a neural network, wherein the binary mask is input directly into the guided probability model; and
> performing the processing at least the building blocks via the processing order to encode or decode the media item.

18. The non-transitory program storage device of claim 17, wherein the guided probability model comprises a multi-scale probability model, and wherein the machine is further caused to signal, in a bitstream to a decoder, one or more of the following: a number of scales in the multi-scale probability model; a chosen metric that evaluates compressibility of individual pixels of the media item; one of an ascending or descending order defined at least within a block of the media item; or a number of batches in which pixels are encoded or decoded.

* * * * *